May 26, 1953 O. T. THOMPSON ET AL 2,639,646
APPARATUS FOR SHAPING TAMPON APPLICATOR TUBE ENDS
Filed Dec. 2, 1948 5 Sheets-Sheet 4
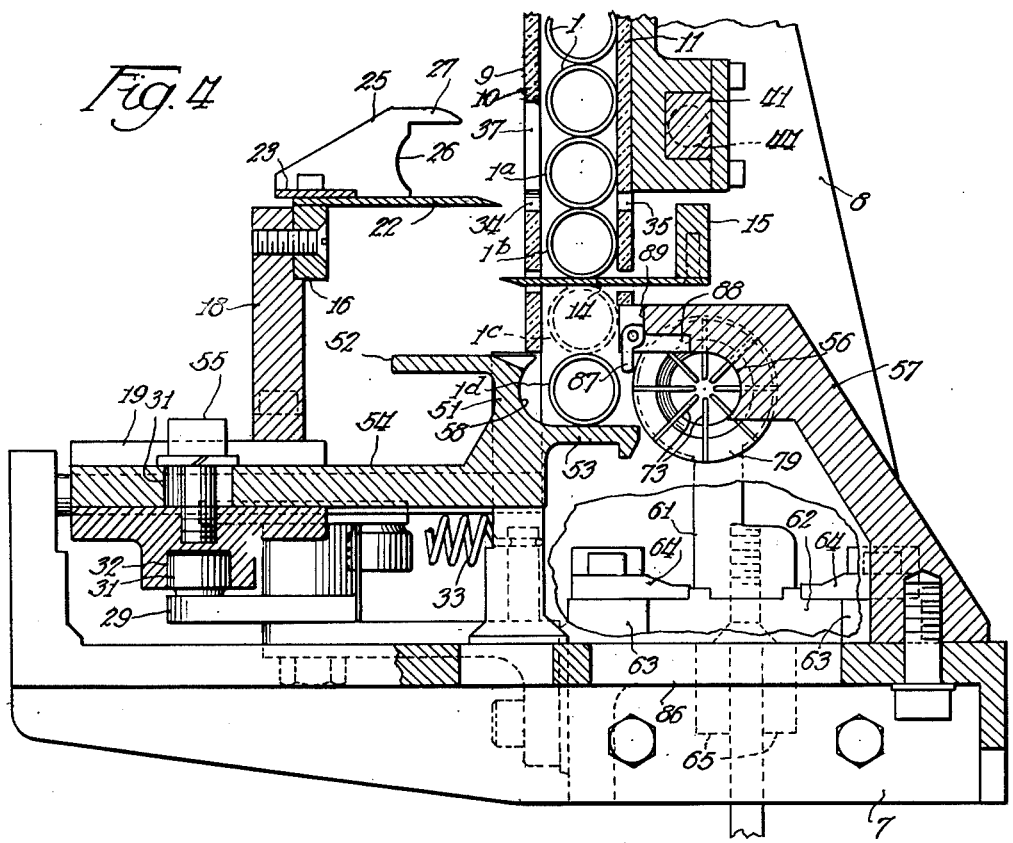
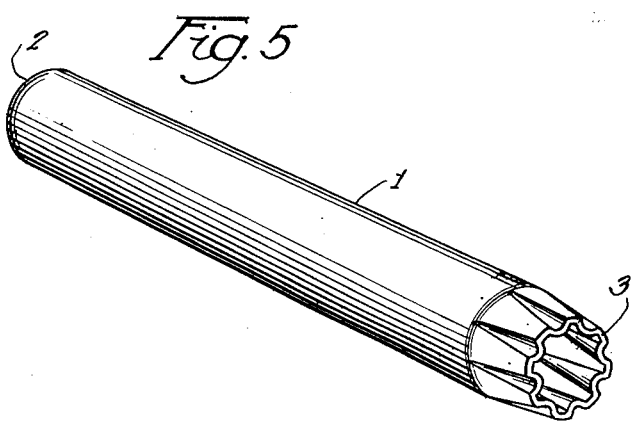
INVENTORS
OSCAR T. THOMPSON, DEC'D
VENETA THOMPSON, EXECUTRIX
AND HOWARD M. RUTH May 26, 1953 O. T. THOMPSON ET AL 2,639,646
APPARATUS FOR SHAPING TAMPON APPLICATOR TUBE ENDS
Filed Dec. 2, 1948 5 Sheets-Sheet 5
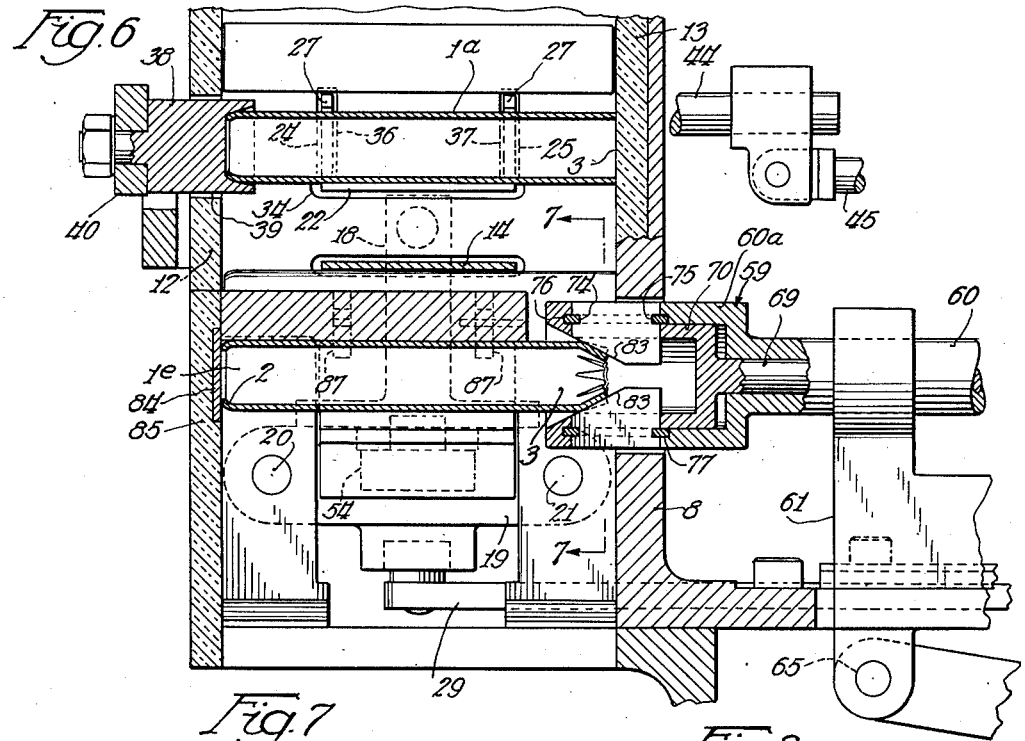
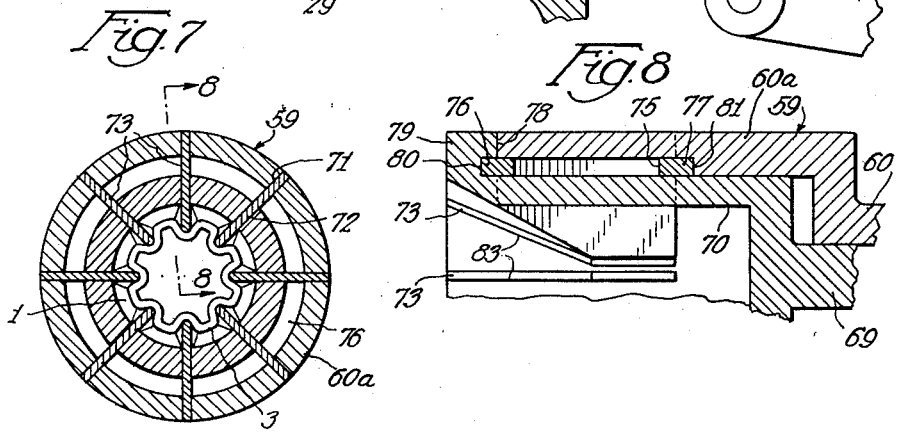
INVENTORS
OSCAR T. THOMPSON, DEC'D
VENETA THOMPSON, EXECUTRIX
AND HOWARD M. RUTH Patented May 26, 1953

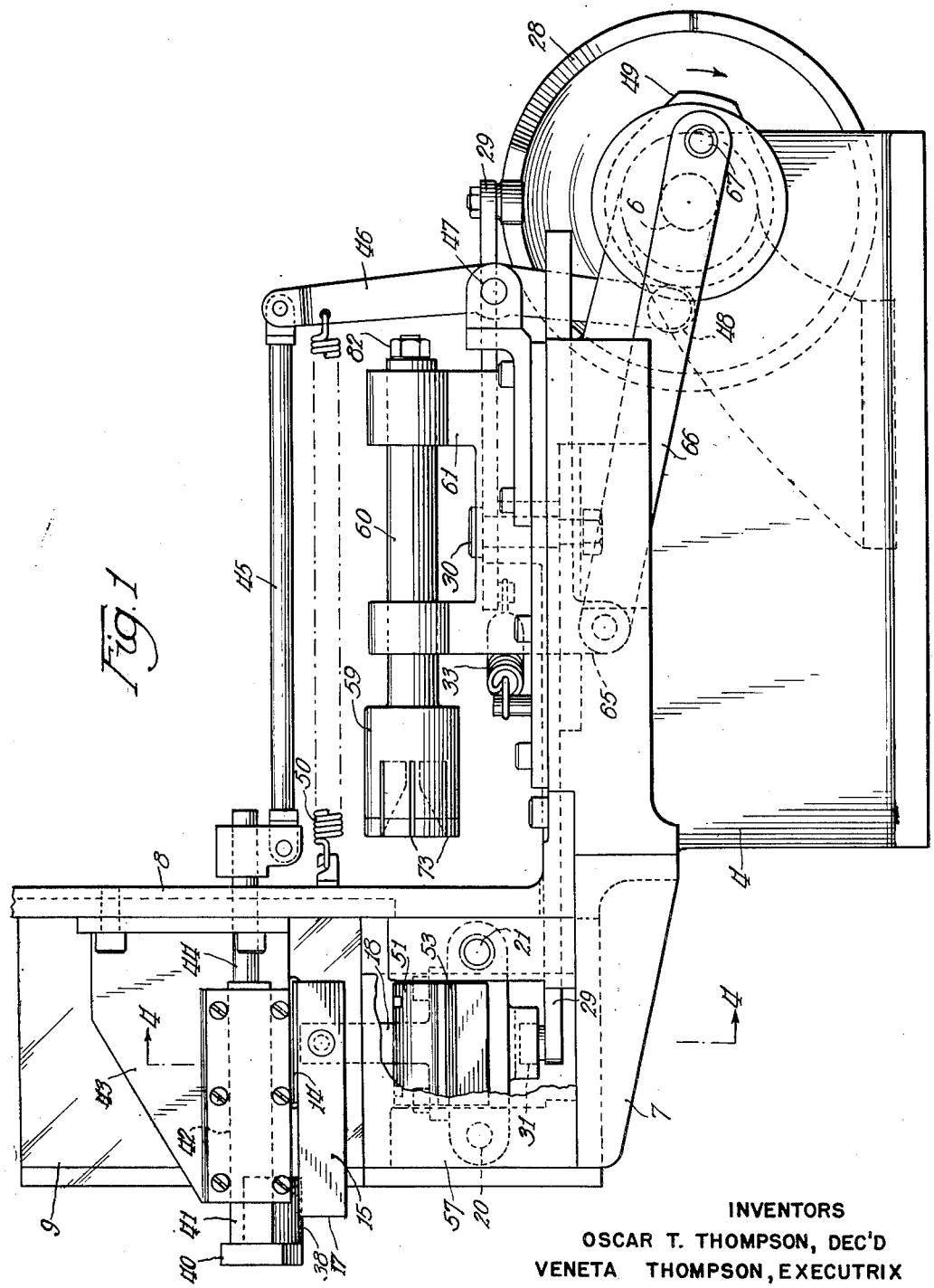

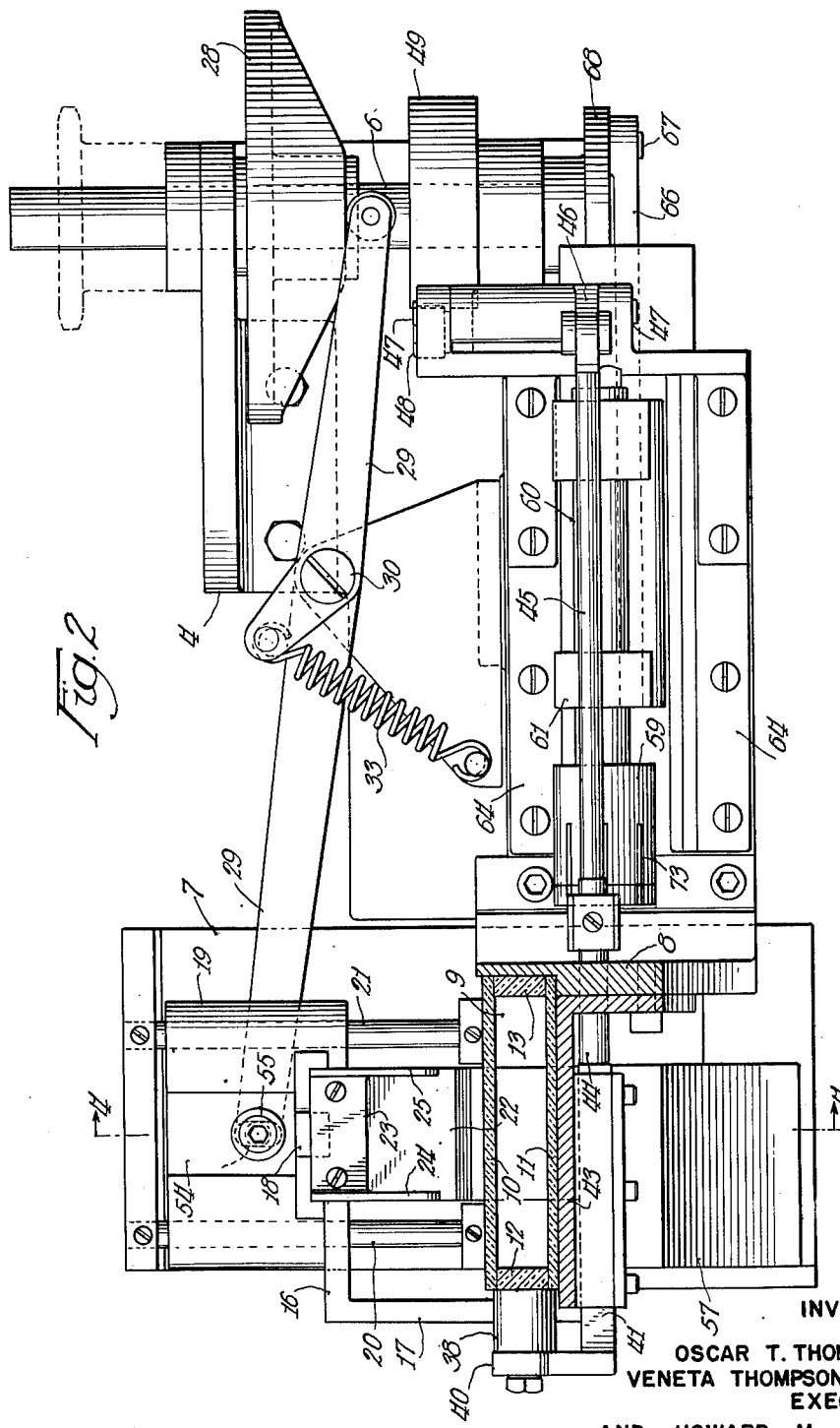

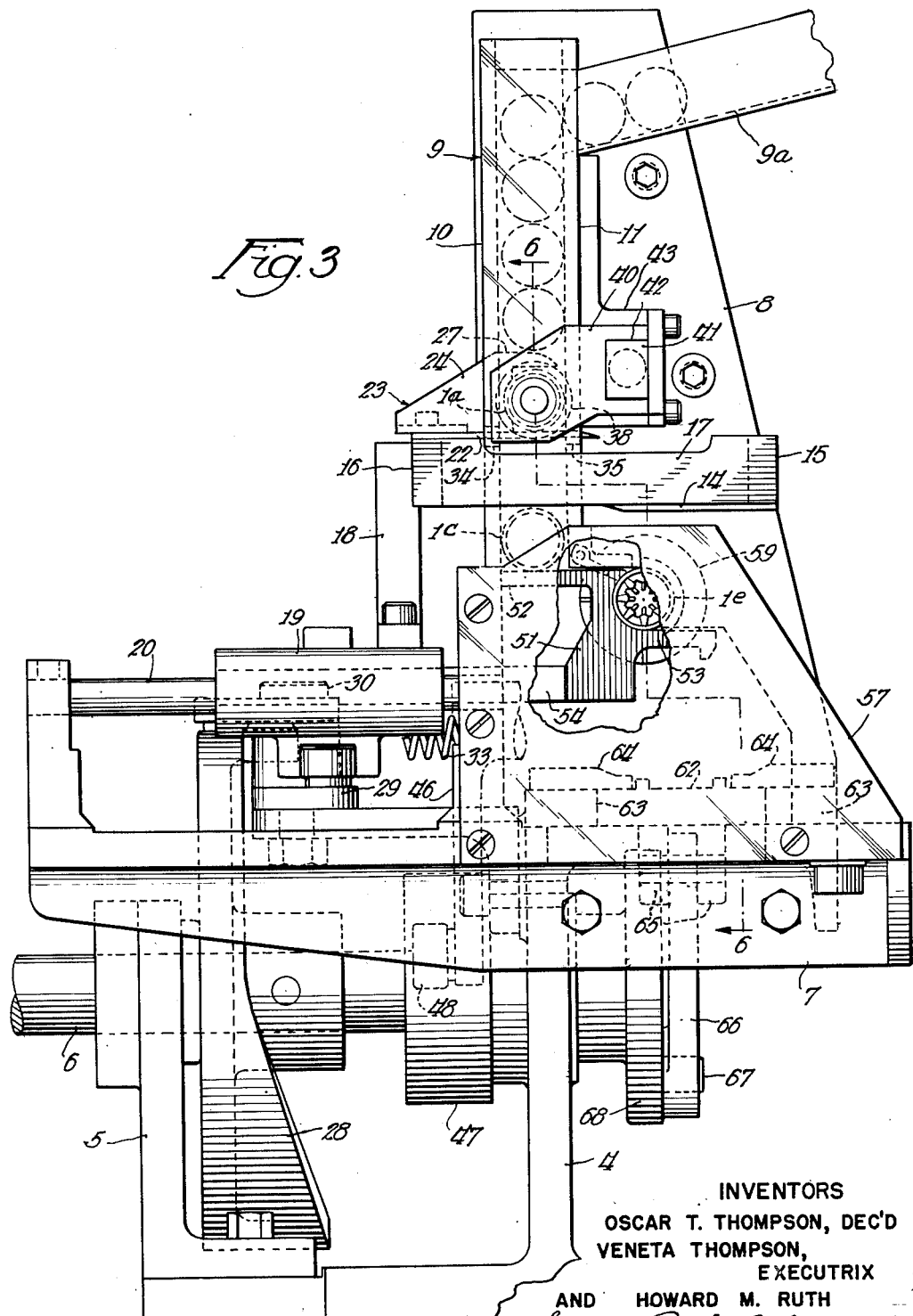

2,639,646

UNITED STATES PATENT OFFICE 2,639,646

APPARATUS FOR SHAPING TAMPON APPLICATOR TUBE ENDS

Oscar T. Thompson, deceased, late of Neenah, Wis., by Veneta Thompson, executrix, Neenah, Wis., and Howard M. Ruth, Appleton, Wis., assignors to International Cellucotton Products Company, Chicago, Ill., a corporation of Delaware Application December 2, 1948, Serial No. 63,084

3 Claims. (Cl. 93—36.5)

This invention relates to an apparatus for rounding, indenting or otherwise shaping the ends of a tampon applicator tube element according to a predetermined pattern.

The main objects of the invention are to provide a mechanism whereby tampon applicator tubes of paperboard or similar material are automatically delivered to apparatus which acts to shape either or both ends according to a predetermined pattern, and to provide such apparatus which will be of relatively simple, efficient and trouble-free character and which will operate quietly at an economical production rate.

Other objects and advantages of the invention will be understood by reference to the following specification and accompaying drawings (5 sheets) in which there is illustrated apparatus embodying a selected form of the invention.

In the drawings,

Fig. 1 is a side elevation;

Fig. 2 is a plan;

Fig. 3 is an end elevation looking at the left-hand end of the mechanism as shown in Figs. 1 and 2;

Fig. 4 is a section on the line 4—4 of Fig. 1;

Fig. 5 is a perspective illustrating a tampon applicator tube having its ends shaped by the illustrated apparatus;

Fig. 6 is a section approximately on the line 6—6 of Fig. 3;

Fig. 7 is a section on the line 7—7 of Fig. 6, and

Fig. 8 is a fragmentary section on the line 8—8 of Fig. 7.

The finished applicator tube shown in Fig. 5 consists of a cylindrical paperboard or like tube 1, the end 2 of which is slightly turned inwardly so as to provide a smooth, more or less rounded outer end. The other end 3 of the tube is more or less corrugated, as shown, so as to be tapered from the normal outside diameter of the tube to a somewhat smaller outside diameter at the extremity 3.

Plain cylindrical tubes are supplied to the apparatus about to be described and the apparatus performs two operations on the tube, one being that of rounding the end 2 and the other being that of starring or corrugating the end 3 to form the tapered end portion.

The apparatus comprises a base 4 which, together with a bracket 5 mounted on the base, rotatably supports a shaft 6. The shaft 6 carries various operating devices which will presently be referred to.

At one end of the base structure 4 and near the top thereof there is mounted a laterally extending bracket member 7 which cooperates with a part of the base 4 to support an upwardly extending bracket 8. Said bracket 8 supports a vertically extending chute 9 comprising opposite side walls 10 and 11 and opposite end walls 12 and 13. Said chute is of such proportions that the tubes delivered to the apparatus may move downwardly in said chute, the tubes being in axially horizontal positions, one over the other, as will be understood by reference to Figs. 3, 4 and 6.

The upper portion of the chute 9 communicates with an inclined guide 9a of any suitable form in which the cylindrical tubes roll downwardly and into the chute 9, as shown in Fig. 3.

As shown in Fig. 4, the tubes in the chute 9 may be supported temporarily by means of a horizontally reciprocable plate 14 carried by the lower edge of an arm 15. The arm 15 constitutes one leg of a horizontally disposed U-shaped member having another leg 16 and a bottom or end bar 17 (see also Figs. 2 and 3) connecting the two legs 15 and 16. The leg 16 of said U-shaped member is fixedly mounted on a post 18 which extends upwardly from a carrier 19 on which said post is fixedly mounted. Said carrier 19 is horizontally slidably mounted on a pair of horizontal, parallel guide rods 20 and 21 (Fig. 2) which are supported at their ends in upstanding portions of the bracket 7.

The leg 16 of said U-shaped member supports another plate 22 (Fig. 4) which is spaced from the plate 14 a distance substantially corresponding or just slightly greater than the normal outside diameter of the tubes which are acted upon by the apparatus. Above the plate 22 is a tube gripping or clamping member 23 formed of sheet metal and provided with parallel side members 24 and 25. The operative edges or ends of said members 24 and 25 are recessed as indicated at 26 in substantial conformity to the curvature of the tubes and they are provided with finger-like projections 27 for a purpose which will presently appear.

The slidable member 19 is reciprocated automatically according to a predetermined plan by means of a cam 28 which is carried by said shaft 6. Said cam acts on a roller carried by one end of a lever 29 which is pivoted intermediate its ends as shown at 30 on a bracket mounted on or formed as a part of the supporting frame structure. The other end of said lever 29 is provided with a roller 31 which fits in a slot 32 formed in the bottom face of a portion of said slide 19. The slot 32 extends transversely of the direction of movement of the slide so as to permit transverse movement of the roller 31 relative to the slide as required by the rocking movement of said lever.

A spring 33 stretched between a portion of said lever 29 and a fixed part of the supporting structure of the apparatus serves to urge the lever 29 to move in such direction that its cam following roller will maintain operative engagement with the cam to the extent permitted by other parts of the mechanism and so that the slide 19 is normally urged to move inwardly toward the tube chute 9.

When the slide 19 is moved to the right from the position shown in Fig. 4, the U-shaped member comprising the legs 15, 16 and 17 will be correspondingly shifted horizontally to the right so that the plate 22 will pass through a slot 34 in the wall 10 of the chute and a slot 35 in the wall 11 as best shown in Fig. 3. The plate 22 thereby underlies the tube in the position indicated at 1a. When the plate 22 is moved inwardly to the position shown in Fig. 3, the fingers 27 of the gripper 23 also enter between the said tube 1a and the one immediately thereover to thereby support said tubes, the tubes above the fingers being elevated slightly as will be apparent from an inspection of Fig. 3.

The side members 24 and 25 of the gripper together with said fingers 27 enter the chute through vertically disposed slots indicated at 36 and 37 (Fig. 6) in the wall 10 of the chute. The fingers 27, the plate 22 and the gripper recess 26 are thereby operative to position the tube 1a against the opposite wall 11 of the chute. The slide 19 and the parts carried thereby are held in the described tube holding position for a predetermined time period during which one end of the tube is acted upon to form it into the desired shape. In this instance, the end 2 is rounded while the tubes are held in the position 1a.

The mechanism for rounding the tube end 2 comprises a forming die 38 (see Fig. 6) which is adapted to be moved inwardly and outwardly through an opening 39 in the end wall 12 of the tube chute. The inner end of said die 38 is so recessed that the end 2 of the tube will be curled or rolled inwardly to the desired extent when the die member 38 is pressed with sufficient force against the end of the tube. As shown in Fig. 6, the tube in the position 1a is held against endwise displacement by engagement of its end 3 with the opposite end wall 13 of the chute.

The die member 38 is carried by an arm 40 which extends laterally from one end of a slide bar 41 which is horizontally slidably mounted in a suitable guideway 42 formed in a bracket 43 carried by the bracket 8 (see Fig. 1). The slide bar 41 has a shaft member 44 extending endwise therefrom and said shaft 44 is suitably connected by means of a link 45 to the upper end of a rock lever 46 which is pivoted intermediate its ends as shown at 47 on a suitable bracket carried by the supporting frame structure. The lower end of said lever 46 is provided with a cam following roller 48 which engages the periphery of a cam 49 carried by said shaft 6. From an inspection of Fig. 2, it will be understood that the upper and lower portions of the lever 46 are offset with respect to each other.

The cam 49 is so formed as to periodically rock the lever 46 in proper synchronization with the positioning of a tube in the position 1a thereby to force the forming die 38 into operative engagement with the end 2 of the tube. A spring 50 stretched between a portion of the lever 46 and a suitable anchor carried by the frame structure serves to return the die to its outwardly disposed position and to cause the cam following roller 48 to maintain operative engagement with the periphery of the cam 49.

After the end 2 of a tube in the position 1a has been formed and the die 38 returned to its outer position, the slide 19 is again moved outwardly (to the left in Fig. 3) thereby withdrawing the plate 22 and moving inwardly the lower plate 14. The tube having its end 2 rounded by the preceding operation will drop from the position 1a to a position of rest indicated at 1b on the plate 14, as shown in Fig. 4. On the next movement of the slide 19 to the right to initiate formation of the end 2 of the next succeeding tube, the tube with its end 2 already formed and which has been delivered to the plate 14, will be dropped from the position 1b to a position represented at 1c in Figs. 3 and 4. When the tube is dropped to the position 1c, another tube holding member 51 will be in an inwardly disposed position as shown in Fig. 3 in which a tailpiece or ledge 52 of said member will be disposed across the chute 9 in position to receive and support said tube in the position 1c. Then on the next movement of the slide 19 to the left, the tube in the position 1c will be dropped to the position indicated at 1d (Fig. 4) where it is supported by an inwardly projecting shelf or ledge part 53 which, like the part 52, is formed integrally with the holding member 51. The position 1c will then be emptied since the plate 14 will be in the inner position shown in Fig. 4 to support the overlying stack of tubes.

The holding member 51 is secured to or formed integrally with a bar 54 which may be adjustably secured to the slide 19 by a clamping bolt 55. It will be seen that the holding member 51 is reciprocated in unison with the tube clamping member 23. When the holder 51 is again moved to the right it will carry the tube resting on the shelf 53 to the left in Fig. 4 and into engagement with a curved seat 56 formed in a bracket 57 which is secured to and extends upwardly from the bracket 7. The curved seat 58 in the holder 51 together with the curved seat 56 of the bracket 57 serve to position a tube in a predetermined position indicated at 1e in Figs. 3 and 6 where the end 3 of the tube is acted upon to taper it and form the starred or corrugated end formation illustrated in Fig. 5.

The shaping of the tapered end of the tube is effected by means of a die 59 which is reciprocated endwise toward and from an applicator tube held in the position 1e as above explained. The die 59 is carried by one end of a rod 60 which is suitably mounted on a bracket 61 which is slidably mounted on the top of the base 4 for movement in the direction of the length of the rod 60 and die 59. The bracket 61 extends upwardly from a slide block 62 (see Figs. 1, 3 and 4), to which the member 61 is rigidly secured, and the slide block 62 is slidable on suitably prepared surface portions of the base 4 and between guides 63 mounted on said base. Gibs 64 suitably secured to said guides 63 prevent displacement of the slide block. The slide block is provided with depending ears 65 through the agency of which one end of a link or connecting rod 66 is pivoted to said block. The other end of said connecting rod 66 is pivoted on a crank pin 67 which projects from a crank disc 68 mounted on the shaft 6.

The shaft 6 being rotated by any suitable driving means, the crank pin 67 will transmit motion through the connecting rod 66 to the slide 62, thereby to effect reciprocation of the rod 69 and die 59.

The die 59 embodies a hollow cylindrical, socket-forming enlargement or head 60a, one end of the rod 69 which is of tubular form as best shown in Fig. 6. A rod 69 is slidably disposed in the bore of the rod 69 and it is provided with an enlarged hollow cylindrical head portion 70 which is slidable longitudinally within said socket head 60a. The cylindrical heads 60a and 70 are provided with a series of radially extending slots, 71 in the head 60a, and 72 in the head 70, the slots in the one member being adapted to be in radial alignment with those in the other member, to receive forming or wedging plates 73. These wedging plates 73 are provided with notches 74 and 75 in their front and rear ends respectively, and these notches receive front and rear retaining rings 76 and 77 respectively as best shown in Figs. 6 and 8. In order to assemble the parts, the slots 71 in the member 60a are open at the front end 78 of the member 60a so that the plates, carried by the member 70 may be moved inwardly and outwardly of the slots 71 by axial movement of the member 70. The front end of the member 70 is provided with an outwardly extending flange part 79 which overlaps the front end 78 of the member 60a to thereby close the front end of the slots 71. Said end flange 79 is provided with an annular recess or seat 80 which receives a portion of the retaining ring 76. The retaining ring 77 fits around the member 70 and seats against a shoulder 81 formed in the member 60a.

It will be seen that the forming or crimping plates 73 may be inserted laterally through the slots 72 in the member 70 and then moved endwise into position over the retaining ring 76. Thereafter the retaining ring 77 is brought into place in the notches 75 so as to support the rear or outer ends of said plates. The rod 69 with the head 70 and the plates 73 seated in said head may then be moved endwise as a unit into place in the die head 60a and rod 69, the parts being locked in position by a clamping nut 82 (Fig. 1) on the outer end of the rod 69.

As best shown in Figs. 6 and 7, the die structure 59, when reciprocated to the left (in Fig. 6) will engage the tube in the position 1e in such a manner that the crimping plates 73 will indent portions of the tube end so as to more or less corrugate it in the form shown. The crimping plates 73 have angularly disposed operative edges 83 which serve to produce grooves or recesses in the tube end of gradually reducing or tapering depth, the length of the corrugations or flutes, of course, depending upon the disposition of the angular edges 83 and the extent of travel imparted to the die structure 59. When the die structure moves to the left in Fig. 6, the tube in the position 1e is held against endwise movement by engagement of its previously rounded end 2 with a hardened insert 84 in the end wall 85 which is, in effect, an extension of the end wall 12 of the chute 9.

Upon withdrawal of the die 59 and retraction of the holder 51, the finished tube will be discharged and dropped downwardly through an opening 86 provided in the frame structure. A suitable container or conveyor may be provided for receiving the finished tubes as desired.

During the retraction of the tube holder 51, the finished tube in the position 1e is prevented from following the holder 51 by means of a pair of dogs 87 which are pivoted as best shown in Figs. 4 and 6 in suitable recesses 88 provided in the member 57. These dogs are so arranged that they may swing upwardly into the recess 88 to permit a tube to pass from the position 1d to the position 1e and to then drop down again to the vertical position shown in Fig. 4 from which it cannot swing to the left because of interengagement of an upper end portion of the dog with a wall or stop 89 formed in the member 87. Hence, when the holder 51 moves to the left, a tube in the position 1e will come into engagement with the member 87 and be thereby brushed off the shelf 53 and caused to drop downwardly to whatever receiving means are provided as already indicated.

From the foregoing explanation it will be seen that the apparatus shown is operative to wholly automatically feed cylindrical paperboard tubes suitable for tampon applicator construction purposes laterally and successively into positions where their opposite ends are swaged or otherwise pressed into a desired shape or form. The finished tubes are automatically ejected from the machine and the machine requires no attention other than that of seeing to it that a supply of tubes is available.

Simplicity is obtained by employing a single reciprocating mechanism to act on tubes delivered simultaneously to two separate stations and also by employing a single reciprocating unit of mechanism to simultaneously actuate the tube end forming devices which respectively act on opposite ends of different tubes.

Various changes in the described structure may be made while retaining the principles of the mechanism described.

We claim:

1. Apparatus of the class described, comprising means for feeding a series of tubes disposed side by side in a direction transversely of their axes, a pair of reciprocable tube holders each movable in a direction transversely of the axes of said tubes into and out of tube holding positions, means for simultaneously moving said tube holders into and out of said tube holding positions, each of said tubes being successively engaged first by one and then by the other of said tube holders, a pair of dies respectively associated with said successive positions in operative relationship to the opposite ends of tubes in said positions for bending the respective tube ends into predetermined form, and means for actuating said dies.

2. Apparatus of the class described, comprising a chute for guiding a series of axially parallel tubes arranged side by side in a predetermined path of travel, a pair of reciprocable tube holders each movable in a direction transversely of the axes of said tubes into and out of tube holding positions, means for simultaneously moving said tube holders into and out of said tube holding positions, each of said tubes being successively engaged first by one and then by the other of said tube holders, a slide member reciprocable in the direction of the axis of a tube held in one of said positions, a die carried by said slide member for engaging and bending one end portion of a tube in one of said positions to thereby form such end portion to the desired shape, means for effecting reciprocation of said slide and die, a second die engageable with the end portion of a tube held in the other of said positions for forming such other end to the desired shape, and means for effecting reciprocation of said dies simultaneously in opposite directions to effect operative engagement thereof with the respectively adjacent tube ends.

3. Apparatus of the class described comprising a pair of reciprocable means for simultaneously holding a pair of tubes in predetermined, separated positions, means for feeding a series of tubes successively first into one and then into the other of said positions, means for simultaneously moving said reciprocable means into and out of tube holding positions, each of said tubes being successively engaged first by one and then by the other of said reciprocable means, a pair of forming devices respectively associated with said predetermined positions arranged to act on the opposite ends of tubes held in said positions, and means for simultaneously actuating said forming devices.

VENETA THOMPSON,
*Executrix of the last will and testament of Oscar T. Thompson, deceased.*

HOWARD M. RUTH.

References Cited in the file of this patent

UNITED STATES PATENTS

| Number | Name | Date |
|---|---|---|
| 1,058,522 | Auchu | Apr. 8, 1913 |
| 1,178,357 | Taliaferro | Apr. 4, 1916 |

FOREIGN PATENTS

| Number | Country | Date |
|---|---|---|
| 66,817 | Germany | Jan. 27, 1893 |
| 319,383 | France | Nov. 11, 1902 |